W. C. BAKER.

RAILWAY CAR HEATER.

No. 11,202.

Reissued Nov. 17, 1891.

Witnesses:
J. Stail
Chas H. Smith

Inventor:
William C. Baker
per Lemuel W. Serrell atty.

UNITED STATES PATENT OFFICE.

WILLIAM C. BAKER, OF NEW YORK, N. Y.

RAILWAY-CAR HEATER.

SPECIFICATION forming part of Reissued Letters Patent No. 11,202, dated November 17, 1891.

Original No. 441,273, dated November 25, 1890. Application for reissue filed September 7, 1891. Serial No. 405,045.

*To all whom it may concern:*

Be it known that I, WILLIAM C. BAKER, a citizen of the United States, residing at the city and State of New York, have invented an Improvement in Railway-Car Heaters, of which the following is a specification.

I have heretofore constructed railway-car heaters with a conical coil of pipe in the fire-chamber through which the water circulates for heating the radiating coils or pipes within the car, and in heaters of this character I have in some instances made use of an inclosing case of sheet metal, such as steel.

The present invention relates to a peculiar casing receiving and surrounding the parts of the heater, such casing being made, as hereinafter described, for the purpose of obtaining more strength and lightness and for avoiding joints and rivets that not only weaken the apparatus, but interfere with the proper formation of joints and connection to the other parts of the apparatus.

Figure 2:
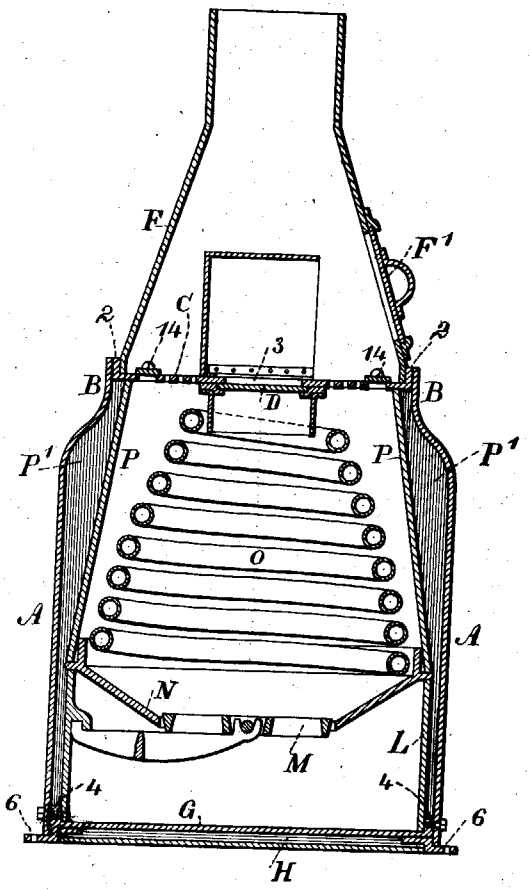
Figure 1:
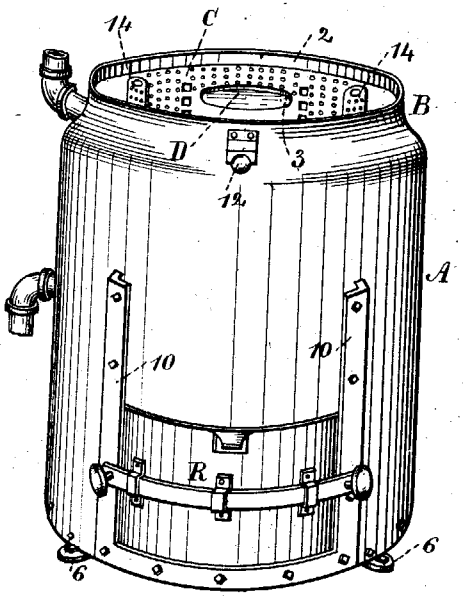

In the drawings, Figure 1 is a perspective view of the case for the heater, and Fig. 2 is a vertical section illustrating the manner in which the heater is constructed.

The case A is of sheet steel made from a seamless tube of the proper diameter, and the upper end portion is contracted at B, and the top plate C is also made of sheet metal, preferably steel, with a flange 2 turned up around its edge. In this plate C is the central opening 3 for the reception of a safety-plate D, which is employed for closing this opening 3, as hereinafter stated, and in this plate C and around the opening 3 there are numerous holes that are sufficiently large for the free escape of the products of combustion; but such holes are too small to allow the fuel to fall out should the heater be upset or injured by a railway collision or otherwise. The exterior of the flange 2 is adapted to fit closely within the contracted upper end B of the case A, and the flange 2 is welded to its place within the upper end of such contracted portion B of the case, so that not only is a perfectly firm union effected between the plate C and the case A, but the parts are free from rivets or projections that might interfere with the base of the conical flue F, which conical flue F is of the usual character and provided with a door F′ at one side that may slide laterally to give access to the opening 3, through which fuel is to be inserted when the safety-plate D is opened.

The bottom plate G of the heater is made with a flange preferably turned upwardly and fitting within the case A, and there are holes through which screw-bolts are inserted through the case and through the flange 4 of the plate G, and there is below the plate G one or more sheets of asbestus or similar non-conducting material, as indicated at H, which asbestus is retained by a plate of sheet iron below it and between such asbestus and the floor, and the lugs 6 are fastened to the plate G and project sufficiently beyond the case A for bolts to pass through such lugs and through the floor for holding the heater in place.

Within the bottom portion of the case A there is a cylindrical ash-pit L, of a size adapted to set upon or within the flange 4 of the base G, and there is a ring N, that receives within it the movable grate M, and the coil of pipe O is of a character now in use, and there is a jacket P around the fire-chamber and within the case A, and I make use of asbestus or similar material in the form of sheets P′ between the jacket P and the case A, and this sheet-asbestus may also extend down between the ash-pit L and the case A.

The ash-pit L, the ring N, the grate M, and the coil O are to be of ordinary construction, such as heretofore made use of by me and in the car-heater known as the "Baker heater" and shown in my Patent No. 380,544. Hence these parts do not need to be further described, and upon the surface of the case A there are slideways 10 for the reception of the door R, which is provided with spring-catches, the ends of which enter openings or holes in the slideways 10, so that when the spring-bolts are drawn back the door R can be raised or lowered, and when in place these spring-bolts firmly retain the door R in its closed condition, or when raised to remove ashes, &c., this spring holds the door up, as shown in my patent, No. 457,920, dated August 18, 1891.

The safety-plate D is usually fitted into place before the case is set over the other parts of the heater, so that this safety-plate D is at the under side of the perforated plate C, and it cannot open by any weight of fuel that may press upon the same should the heater become inverted, and there is a handle with a latch or other fastening at 12 for holding the safety-plate in its closed condition and by which handle the safety-plate can be slid for the insertion of fuel through the opening, and I provide narrow openings with swinging covers 14, pivoted in place, which openings are at opposite sides and above the space between the coil O and the inside of the jacket P, so that a suitable brush may be inserted through these narrow openings when the covers 14 are turned aside for sweeping off or cleaning the exterior surfaces of the pipes forming the coil O should there be any accumulation of carbonaceous materials upon the same.

In consequence of the peculiar construction of this case great strength is obtained. There is nothing that is liable to break or to become injured should the car be capsized or wrecked, and it is not possible for the fire to be thrown out of the fire-chamber in such a manner as to set the car on fire. Hence this heater is very reliable, and at the same time the case, being set in close proximity to the exterior of the heater, does not increase the diameter of the heater appreciably.

I claim as my invention—

1. The combination, in a railway-car heater having a coil of heating-pipes within the fire-chamber, of a case contracted at its upper end and a flanged perforated plate at the top end with its flange welded to the upper contracted part of the case and forming also an annular receiver for the base of the ascending smoke-flue, substantially as set forth.

2. The case A of a seamless metal tube, contracted at the upper end, in combination with a perforated plate C, having a central opening, a safety-plate beneath the plate C and at the central opening, a base-plate G with an upturned flange bolted to the tubular case A, the separate ash-pit L, the ring N, supported by such ash-pit, a movable grate M within the ring, the coil O for circulating water within the fire-chamber, and the sliding door R, covering the opening to the ash-pit, substantially as set forth.

3. The combination, with the railway-car heater having a heating-coil O within the fire-chamber, of the jacket P, surrounding the fire-chamber, the ring N and the grate M within the ring, the ash-chamber L, the case A, surrounding the other parts of the heater, and sheet-asbestus or similar material intervening between the jacket P and the case A, the perforated plate C, having an upturned flange within the contracted upper end of the tubular case A, and the flange 2, being welded to the upper end of the case A, substantially as set forth.

4. The combination, in a car-heater, of a coil for circulating water, a fire-pot surrounding the same, a grate and ash-pit inclosure below the fire-pot, a fire-proof safety-case surrounding the fire-pot and the ash-pit inclosure and made of one piece of metal terminating at the upper end as a rim, a perforated plate within the rim and permanently secured thereto at its edges, and a movable safety-plate at the opening in the perforated plate, substantially as set forth.

5. The combination, in a car-heater, with the coil and the fire-chamber for the same, of a case surrounding the fire-chamber, a perforated metallic plate within the upper end of the case and connected at its edges to the same, there being a fuel-opening in said plate, a safety-plate covering the opening in the perforated plate and a connection for moving the safety-plate, such safety-plate being permanently supported at its edges by the perforated plate, so that it cannot open by the weight of fuel if the heater is overturned, substantially as set forth.

6. The combination, in a car-heater, with the coil and the fire-chamber for the same, of a case surrounding the fire-chamber, a perforated metallic plate within the upper end of the case and connected at its edges to the same, there being a fuel-opening in said plate, and a safety-plate covering the opening in the perforated plate and a connection for moving the safety-plate, such safety-plate being below and permanently connected to the perforated plate, so that it cannot open by the weight of fuel if the heater is overturned, substantially as set forth.

Signed by me this 1st day of September, 1891.

W. C. BAKER.

Witnesses:
LEMUEL W. SERRELL,
WILLIAM G. MOTT.